United States Patent Office 2,890,989
Patented June 16, 1959

2,890,989
METHOD FOR THE PRODUCTION OF CAROTENES

Ralph F. Anderson, Peoria, Ill., assignor to the United States of America as represented by the Secretary of Agriculture No Drawing. Application July 1, 1957
Serial No. 669,387

4 Claims. (Cl. 195—78)

(Granted under title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of beta-carotene and related carotenoids by microbiological processes.

Heretofore production of beta-carotene and related carotenoids having commercial utility has been by extraction from natural plant sources or, more recently, by chemical synthesis. Certain green, leafy crops contain relatively large amounts of carotenoids and are dried in the sun or artificially and are then added to animal feed to supply vitamin A potency. Such material is of especial utility in poultry rations since it imparts desirable pigmentation to egg yolks and certain tissues of poultry, thereby affording a more marketable commodity. Beta-carotene is also of utility in commerce in imparting color ranging from yellow to red to foodstuffs. Vitamin A, which arises from beta-carotene and certain closely related compounds, is essential for optimum human visual function. Lack of the vitamin causes general debility in man and animals. The animal body is not capable of synthesizing vitamin A or its immediate precursors, hence must rely on the food eaten as its source of the required vitamin.

Microorganisms have been reported as capable of producing beta-carotene, principally among which are yeasts and the fungi which belong to the order Mucorales. When suitable mating types of organisms classed as Mucorales are combined and grown in submerged culture as described in the copending application for patent, Serial No. 640,991, filed February 18, 1957, now Patent Number 2,865,814 there is rapid production of larger quantities of beta-carotene than have been obtained in prior art.

A method of further increasing the beta-carotene production by micro-organisms many-fold beyond that experienced by prior art has been discovered. Yields of the desired product are such that microbiological production of beta-carotene for use in animal feeds or for application as a coloring agent is now more feasible on a commercial basis. In addition to giving better yields of carotene, the present invention offers other advantages which will be apparent from the following description.

According to the invention, a medium is prepared comprising an assimilable carbon source, a source of assimilable nitrogen, a thiamin source and the usual mineral nutrients. In addition, a lipid material, such as a naturally occurring fat or oil or the fatty acid portion thereof, a surface active agent, such as a detergent or wetting agent, and beta-ionone are incorporated into the medium. The appropriate organism, or mixed organisms, are then added as an inoculum and the medium is fermented aerobically. The time of fermentation may vary from 2 to 7 days depending upon the organisms employed and the concentration of the inoculum. As the carbon source, it is advantageous to add from 2 to 10 percent of a material such as glucose, sucrose, cane or beet molasses, starch or the like. The assimilable nitrogen source may comprise proteinaceous materials such as soybean meal, corn steep liquor, fermentation residues, grain byproducts or whole grains; in general any of the commonly used proteinaceous raw materials will suffice. The nitrogen source may consist of, or may be augmented by chemical compounds such as urea, nitrate compounds, ammonium salts, and the like. As an advantageous alternate, both the carbon and nitrogen source may be embodied in one ingredient such as corn, wheat or soybeans. I have found that satisfactory media can be composed from suitably ground grains or soybeans used alone or in combination with each other at levels from 3 percent to 15 percent of the nutrient medium. The crude, unfractionated components of the medium can also supply the necessary mineral requirements such as magnesium, calcium, iron, and the like. I prefer to add thiamin to the medium at levels from 0.1 to 5 milligrams per liter of medium, in the form of a water solution of thiamin hydrochloride. However, other sources of thiamin such as natural plant material are also satisfactory.

The oil or fat which is added to the medium may be incorporated prior to sterilization of the medium or may be added aseptically to the fermentation at the time of inoculation. I generally employ lipids such as soybean oil, cottonseed oil, peanut oil, lard oil and the like at levels ranging from 1 to 6 percent of the culture medium. Fatty acids such as those found in naturally occurring animal or vegetable fats, are also satisfactory. The effect of the oil or lipid material in the fermentation is not that of an antifoam agent. The concentrations of such substances when used as defoamers are much lower than those employed in this invention. Furthermore, mineral oil, which is an effective defoamer in many fermentation processes, is without effect in the process described herein.

From the myriad of surface active agents commercially available, I have found that alkyl aryl polyether alcohols and compounds of fatty acids and sorbitol used at levels from 0.05 to 1 percent of the medium are effective in enhancing carotene production. I find it convenient to add an aliquot of a solution of the surfactant to the medium just prior to sterilization. However, it is not necessary to sterilize the surfactant with the medium; thus, as a matter of convenience, the surfactant may be aseptically added to the autoclaved nutrient medium from a presterilized stock solution.

Beta-ionone is effective in promoting beta-carotene production when added to the submerged fermentations at levels which may vary from 10 to 500 micrograms per 100 milliliters of fermentation medium. Since beta-ionone retards initial growth of some of the organisms somewhat, I find it advantageous to add a suitable quantity of sterile beta-ionone to the fermentations after growth has progressed for 24 to 48 hours. This provides for the stimulation of carotene production without the hazard of depressing the total growth.

The desirable hydrogen ion concentration for the beginning of the fermentation is in the range 5.5 to 7.0, although the precise optimum will vary with the particular strain of organism being used. I usually prepare a medium containing the necessary nutrients and then adjust the pH to the range 5.5 to 7.0 just before the medium is autoclaved. With the media and organisms employed, the pH tends to remain in the optimum range and no further adjustment during the incubation period is required.

The grain portion of the nutrient culture medium may or may not be subjected to an acid or alkaline hydrolysis procedure prior to formulating the medium. If a combination of two plant materials such as ground corn and soybean oil meal is used in the medium, I find that optimum results are obtained when the soybean meal is subjected to an acid hydrolysis procedure, but it is not necessary to saccharify the ground corn. I have also obtained good yields of beta-carotene when both the corn and soybean oil meal were hydrolyzed and good yields have resulted when prior hydrolysis was not practiced.

For optimum results, the fermentation is carried out under submerged aerobic conditions. The agitation and aeration rates are not critical and the invention is not limited to specific values for these variables. For convenience, air is usually supplied to the fermentation flasks by incubating them on a shaking device which describes a 2-inch horizontal circle 200 times per minute. The amount of oxygen suplied to the culture also is a function of the volume of medium and the size fermentor used. I have found that 100 milliliters of medium contained in a 500-milliliter conical flask is satisfactory.

The amount of inoculum added to the fermentation medium is not critical. When mixed (+) and (−) strains of organisms are to be used, I prefer to add a pregerminated inoculum composed of equal quantities of each organism to give a total amount of 3 to 10 percent by volume of the medium to be fermented. If a single strain, i.e., unmated, organism is used, I generally use from 3 to 10 percent inoculum. The temperature of the fermentation should be kept within the range 20° to 35° C. The temperature is not critical within this range but about 28° C. is optimum.

The beta-carotene, which is the predominant carotenoid formed by most of the organisms employed in this process, may be determined spectrophotometrically after suitable chromatographic separations according to the procedure detailed in the 6th edition of Methods of Analysis of the Association of Official Agricultural Chemists, 1945.

The following examples are given by way of illustration and are not intended as a limitation of this invention. Indeed, many widely different embodiments of the present invention may be made without departing from the spirit and scope thereof. It is to be understood that the invention is only limited as defined in the appended claims.

EXAMPLE 1

The following medium was prepared (concentration of ingredients is given in grams per liter of medium unless otherwise specified):

Soybean oil meal _____ 43
Ground corn _____ 23
$KH_2PO_4$ _____ 0.5
Thiamin·HCl _____mg__ 1.0

Prior to its inclusion in the medium, the corn was subjected to acid hydrolysis by autoclaving for 1½ hours at 121° C. in 500 milliliters of 0.2 N $H_2SO_4$. The pH of the medium was adjusted to 6.1 by addition of strong NaOH. The medium was then dispensed in 100 ml. lots in 500 ml. conical flasks which were plugged with cotton and sterilized for 20 minutes at 121° C. (15 lbs. steam pressure). Five milliliters each of 48 hour old vegetative mycelium of Blakeslea trispora NRRL 2456 (+) and Blakeslea trispora NRRL 2457 (−) were aseptically added to each flask. Two mls. each of sterile soybean oil and sterile cottonseed oil and 0.5 ml. of a sterile 25 percent water solution of an alkyl aryl polyether alcohol were added to each flask. The flasks were then incubated at 28° C. on a rotary shaker, which described a 2-inch circle 200 times per minute, for a period of 6 days. Beta-ionone was added aseptically to each flask after 48 hours incubation in the amounts given in Table 1. The mycelium in the flasks was harvested by filtration, dried in a vacuum oven at 35° C. and then was extracted with petroleum ether (B. P. 33°–57° C.). The beta-carotene in the extract was determined by spectrophotometric comparison with an authentic sample of beta-carotene in the same solvent.

The effects of various levels of beta-ionone on carotene production by the combined (+) and (−) strains of Blakeslea trispora are summarized in Table 1.

*Table 1*

| Beta-ionone concentration, micrograms per flask | Beta-carotene yield, micrograms per flask |
|---|---|
| 0 | 2,800 |
| 10 | 11,600 |
| 100 | 12,600 |
| 1,000 | 19,500 |
| 10,000 | 21,200 |
| 100,000 | 34,800 |

This example shows that beta-ionone is effective in increasing yields of beta-carotene relaized in the illustrated process.

EXAMPLE 2

This example shows the effects of various surfactants on beta-carotene production by combined (+) and (−) strains of Blakeslea trispora. The composition of the medium varies from that of Example 1 only in that the amount of corn was increased to 27 grams per liter and that both the corn and soybean oil meal were subjected to the acid hydrolysis described in the preceding example. One-tenth milliliter of beta-ionone was aseptically added to each flask 48 hours after the incubation was begun. The inoculum and incubation were as described in Example 1. Surface active agents were added aseptically to each flask just prior to the incubation period in the amounts listed in the following table. Water solutions of the surfactants were previously sterilized at 121° C. for 15 minutes.

The results are reported in Table 2.

*Table 2*

| Surface Active Agent | Percent added (vol./vol.) | Beta-carotene, micrograms per flask |
|---|---|---|
| None | | 1,540 |
| Alkyl aryl polyether alcohol [a] | 0.06 | 40,500 |
| Alkyl aryl polyether alcohol [b] | 0.06 | 30,000 |
| Alkyl aryl polyether alcohol [c] | 0.06 | 34,000 |
| Sorbitan monolaurate | 0.06 | 24,300 |

[a] Polyether chain length average 9–10 ethylene oxide units.
[b] Polyether chain length average 12–13 ethylene oxide units.
[c] Polyether chain length average 7–8 ethylene oxide units.

This example shows the effect of various surfactants in the fermentation medium in that yields are increased from 15- to 30-fold by their application.

EXAMPLE 3

A similar series of flasks were prepared, inoculated and incubated as described in Example 1. However, the crude carbohydrate and nitrogen source consisted of various grains used at a level of 75 grams per liter. In one set of flasks, the grains were added to the medium without prior hydrolysis and 1 percent corn steep liquor was added to each flask in this series to promote rapid growth. An accompanying series of flasks was set up with grain which had been acid hydrolyzed in the same manner as was the corn in Example 1. No corn steep liquor was added to these flasks. All flasks received one-tenth milliliter of beta-ionone after 48 hours' incubation and the contents of the flasks were harvested after six days as previously described.

The results are summarized in Table 3.

Table 3

| Grain | Yield of beta-carotene, micrograms per flask | |
|---|---|---|
| | Hydrolyzed grain | Unhydrolyzed grain |
| Corn | 5,240 | 12,230 |
| Oats | 12,900 | 6,060 |
| Wheat | 7,420 | 3,580 |
| Soybean Oil Meal | 17,300 | 4,860 |
| Rice | 4,740 | 11,330 |
| Barley | 6,250 | 6,740 |
| Soybeans | 31,160 | 17,970 |
| Rye | 3,640 | 12,480 |

This example indicates that various grains can provide both nitrogen and carbohydrate required in the process and that hydrolysis of the raw material may sometimes be advantageous.

EXAMPLE 4

A medium composed of, in grams per liter, hydrolyzed corn, 75; corn steep liquor, 10; $KH_2PO_4$, 0.05; acid hydrolyzed casein, 0.2; and thiamin·HCl, 0.001; was prepared and dispensed in 100 ml. quantities in 500 ml. flasks. The flasks were sterilized, inoculated and incubated as described in the preceding examples. Each flask received one-tenth milliliter of sterile beta-ionone and 0.5 ml. of sterile 25 percent (aq.) alkyl aryl polyether alcohol. Sterile natural oils as noted in Table 4 were added to each flask in the percentages (vol./vol.) given just prior to the incubation period.

The results are summarized in the following table:

Table 4

| Oil, percent added | Beta-carotene, micrograms per flask |
|---|---|
| None | 1,000 |
| Olive, 3 | 4,115 |
| Corn, 3 | 4,615 |
| Peanut, 3 | 4,340 |
| Peanut, 4 | 7,790 |
| Soybean, 3 | 7,200 |
| Cottonseed, 2 | 10,200 |
| Cottonseed, 3 | 10,550 |
| Cottonseed, 4 | 12,400 |
| Cottonseed, 5 | 10,450 |
| Cottonseed, 2 and soybean, 2 | 15,000 |
| Cottonseed, 2 and peanut, 2 | 10,775 |
| Cottonseed, 1 and soybean, 2 | 8,050 |
| Cottonseed, 1 and soybean, 1 | 4,000 |
| Lard oil, 2 | 1,650 |

The results show that, with the particular medium and conditions used, natural oils can stimulate carotene production as much as 12- to 15-fold.

EXAMPLE 5

The fact that this process is applicable to organisms other than those noted in the preceding examples can be illustrated in the following example. A medium composed of 5 percent corn (unhydrolyzed), 5 percent soybean oil meal (unhydrolyzed), 0.05 percent $KH_2PO_4$ and 1 mg. per liter of thiamin·HCl was prepared in the usual manner. Two milliliters each of sterile cottonseed oil and sterile soybean oil were added to the flasks just prior to inoculation. Each flask also received 0.5 ml. of sterile 25 percent (aq.) alkyl aryl polyether alcohol. One-tenth ml. of sterile beta-ionone was added to each flask after 48 hours' incubation. Conditions of incubation were identical with those given in the previous examples. The inoculum was composed of 5 percent (vol./vol.) each of vegetative mycelium of the pairs of organisms listed in the following table.

The carotene yields obtained with the various organisms are summarized in Table 5.

Table 5

| Organisms used | Beta-carotene, micrograms per flask |
|---|---|
| Blakeslea trispora NRRL 2456+B. trispora NRRL 2457 | 48,190 |
| B. trispora NRRL 2457+B. trispora NRRL 1348 | 51,600 |
| B. trispora NRRL 2456+B. trispora NRRL A-5950 | 35,800 |
| B. trispora NRRL 2456+B. trispora NRRL A-5951 | 21,000 |
| B. trispora NRRL 2456+Choanephora conjuncta, NRRL 2562 | 7,600 |
| C. conjuncta NRRL A-6985+C. conjuncta NRRL A-6946 | 4,650 |
| B. trispora NRRL 2457+B. trispora NRRL 1718 | 15,400 |
| C. conjuncta NRRL A-6947+C. conjuncta NRRL A-6946 | 3,700 |

What is claimed is:

1. A method for producing beta-carotene comprising incubating an organism selected from the group consisting of an unmated strain and mated (+) and (−) strains of beta-carotene-producing organisms selected from the species consisting of *Blakeslea trispora* and *Choanephora conjuncta* in an aqueous nutrient medium having a pH ranging about from 5.5 to 7.0 and composed of an assimilable carbon source, an assimilable nitrogen source, a thiamin source, nutrient mineral salts, an assimilable lipid material selected from the group consisting of a naturally occurring fat and oil and the fatty acid components thereof, a surface active agent selected from the group consisting of an alkyl aryl polyether alcohol and the reaction product of a fatty acid and sorbitol, and beta-ionone, said lipid material being employed at a level of about from 1 to 6 percent of the nutrient medium, said surface active agent being employed at a level of about from 0.05 to 1 percent of the nutrient medium, and said beta-ionone being employed at a level of about from 10 to 500 micrograms per 100 milliliters of the nutrient medium, said incubation being carried out under submerged aerobic conditions at a temperature ranging from about 20° to 350° C. for a period of about from 2 to 7 days to produce beta-carotene.

2. The method of claim 1 wherein the nitrogen and carbon sources are combined in one source selected from the group consisting of a grain, a seed, and mixtures thereof which is employed at a level of about from 3 to 15 percent of the nutrient medium.

3. The method of claim 1 wherein the lipid material is a naturally occurring oil.

4. The method of claim 1 wherein the lipid material is a naturally occurring fat.

References Cited in the file of this patent

FOREIGN PATENTS 679,087    Great Britain _____ Sept. 10, 1952

OTHER REFERENCES

Annual Review of Biochemistry, vol. 21, pages 488–489 (1952).

Annual Review of Biochemistry, vol. 22, page 531 (1953).

Annual Review of Biochemistry, vol. 24, pages 509–515 (1955).

Barnett et al.; Science, vol. 123, page 141, January 1956.

UNITED STATES PATENT OFFICE

CERTIFICATE OF CORRECTION

Patent No. 2,890,989                                                           June 16, 1959

Ralph F. Anderson

It is hereby certified that error appears in the printed specification of the above numbered patent requiring correction and that the said Letters Patent should read as corrected below.

Column 4, line 23, for "relaized" read -- realized --; column 6, line 43, for "350° C." read -- 35° C. --.

Signed and sealed this 10th day of November 1959.

(SEAL)
Attest:

KARL H. AXLINE                                          ROBERT C. WATSON
Attesting Officer                                      Commissioner of Patents